July 13, 1965 D. BERLIN 3,194,577
COMBINATION BABY WALKER AND JUMPER
Filed March 22, 1962
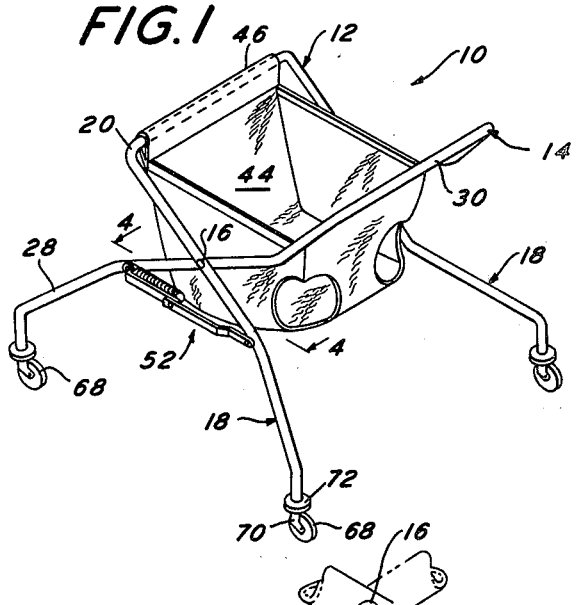
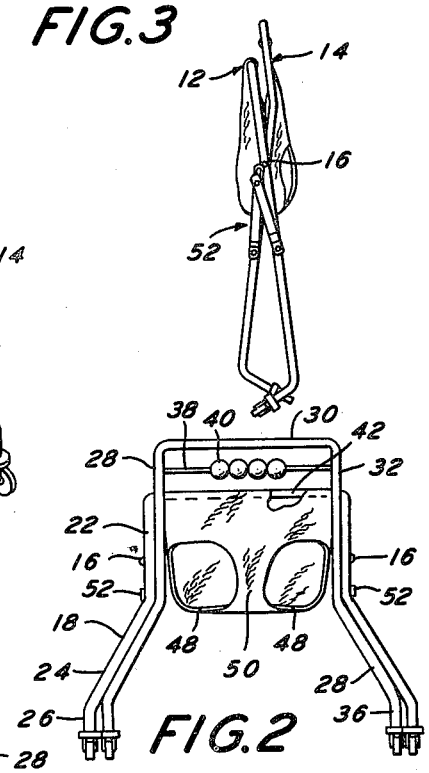
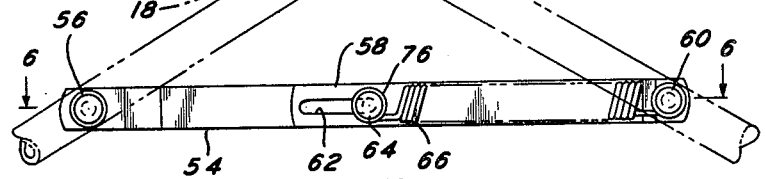
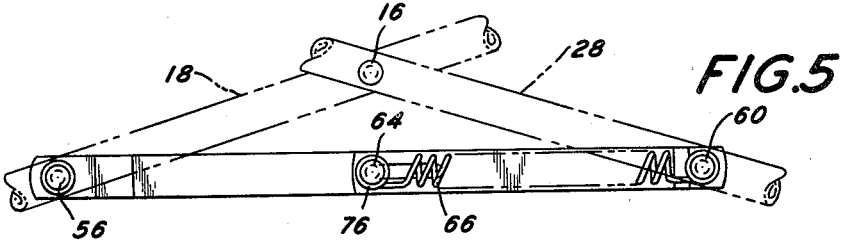
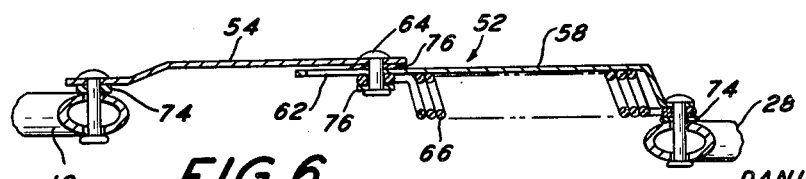
INVENTOR.
DANIEL BERLIN
BY
Caesar and Rivise
ATTORNEYS.

United States Patent Office 3,194,577
Patented July 13, 1965

3,194,577
COMBINATION BABY WALKER AND JUMPER
Daniel Berlin, 4424 Paul St., Philadelphia, Pa.
Filed Mar. 22, 1962, Ser. No. 181,617
3 Claims. (Cl. 280—41)

This invention relates to a device which may simultaneously be used as a baby walker and a baby jumper.

Baby jumpers are generally well known in the art. These devices basically comprises resiliently mounted seats in which a child can jump up and down. The resiliency always maintains the seat in a horizontal orientation. Seats of this type provide an excellent source of exercise and enjoyment for a young child.

Baby walkers are also known in the art. These devices basically comprise a seat which is supported above the ground by a tubular frame having a plurality of wheels engaging the ground. When the baby is placed in the walker its feet rest just at ground level. When a child is too young to walk, but old enough to move its feet along the ground, he can propel himself by pushing the walker along the ground with his feet.

Heretofore, no device was made which served effectively as a combination of a child walker and child jumper seat. The device of the instant invention serves efficiently in both capacities.

It is therefore an object of this invention to provide a novel combination baby walker and jumper.

It is another object of this invention to provide a combination baby walker and jumper that is inexpensive to manufacture, but efficient in its operation.

It is a further object of this invention to provide a combination baby walker and jumper which is collapsible to a compact position for easy storage.

These and other objects of this invention are accomplished by providing a combination baby walker and jumper comprising a pair of frame members being pivotally secured together, a sling seat supported by said frame members adjacent the tops thereof, a plurality of ground-engaging wheels supported by the bottoms of said frame members, and a spring linkage joining one of said frame members to the other, said spring linkage including means limiting the expandability of a spring within said linkage whereby the separation of one frame member relative to the other is controlled.

Other objects and many of the attendant advantages of this invention will be readily appreciated as the same becomes better understood by reference to the following detailed description when considered in connection with the accompanying drawings wherein:

FIG. 1 is a perspective view of the device of this invention;

FIG. 2 is a front elevational view of the device of FIG. 1;

FIG. 3 is a side elevational view showing the device of FIG. 1 in its collapsed condition;

FIG. 4 is an enlarged sectional view taken along the line 4—4 of FIG. 1 and showing the spring in its contracted condition;

FIG. 5 is an enlarged sectional view similar to FIG. 4 but showing the spring in its expanded condition; and, FIG. 6 is a sectional view taken along the line 6—6 of FIG. 4.

Referring now in greater detail to the various figures of the drawings wherein similar reference characters refer to similar parts, a combination baby walker and jumper embodying the present invention is shown generally at 10 in FIG. 1.

Device 10 basically comprises a first frame member 12 and a second frame member 14. Each of these frame members is generally U-shaped and they are pivotally connected by pivot pins 16.

U-shaped frame member 12 includes legs 18 and an upper bridging section 20 integral therewith. As seen in FIG. 2, each leg 18 includes a vertical section 22 adjacent the top, a downwardly and outwardly extending section 24 and a vertical section 26 at the bottom thereof.

Second frame member 14 includes a pair of legs 28 and and upper bridging section 30. As seen in FIG. 2, the upper sections 32 of legs 28 extend downwardly in a vertical plane. Sections 34 are integral with sections 32 and extend downwardly and outwardly. Lower sections 36 also extend downwardly in a vertical plane. Mounted between legs 28 is a first horizontal bar 38 and balls 40 slidably mounted thereon. A second horizontal bar 42 is also mounted between legs 28.

The purpose of downwardly and outwardly extending sections 24 and 32 is to provide stability for the device when in use. These sections prevent tipping of the device by the baby.

As seen in FIG. 2, frame member 12 is slightly wider than frame member 14 and the latter frame member pivots within the former on pins 16. A sling seat 44 is mounted on the frame members and lies between them. The rear portion of the sling seat includes a loop 46 which is telescoped over bridging section 20. The front section of the sling seat includes a similar loop which is telescoped over second horizontal bar 42 (FIG. 2). The sling seat includes a pair of leg openings 48 separated by a crotch strap 50. The sling seat may be made of numerous materials, but a vinyl resin coated fabric is preferred for its strength and moisture impermeability.

The two frames are maintained in their seat supporting position by means of a pair of spring linkages 52. As seen in FIG. 4, each spring linkage includes a first arm 54 pivotally secured to leg 18 by means of rivet 56. A second arm 58 is pivotally secured to leg 28 by means of rivet 60. Second arm 58 includes an elongated slot 62 at the unsecured end thereof. A pin 64 which is secured to the unsupported end of arm 54 slideably engages slot 62. A tension spring 66 is pivotally secured to pin 64 at one end and to rivet 60 at the other.

Frame members 12 and 14 are preferably made of tubular steel. Secured within the open ends of each frame member is a ground engaging wheel 68. Each wheel 68 is rotatably mounted within a yoke 70 which in turn is swivelly mounted within its corresponding frame member. A resilient plastic cap 72 frictionally engages the leg of each frame member at a position adjacent each of the wheels. The cap member is used to protect furniture and other objects around the home from damage when a child accidentally walks the device into the furniture. Since the wheels are swivelly mounted they will always be trailing the legs in the direction of motion. Thus, the caps 72 will strike the furniture prior to the wheels, thereby giving adequate protection.

In use, a child is placed within the sling seat 44 with his legs extending through openings 48. Since bridging section 30 extends higher than the sling seat as seen in FIG. 2, the child can grasp it for security and balance. The weight of the child will depress the springs 66 a sufficient amount to permit the child's feet to touch the ground. By moving his feet in a walking motion the child can propel the device around the room, even though the child is not sufficiently old or strong to walk unaided by any person or device.

As the child tires of walking, or is not sufficiently old, he can use the device as a child jumper by jumping up and down in the seat. The resilient mounting of one frame member relative to the other permits the continued jumping of the child without fear of injury from a sudden jolt. The slot 62 provides a limit to the expandability of the spring 66. This slot provides against the stretching of the spring beyond its elastic limit when too heavy a child is placed in the jumper or an extremely heavy weight is inadvertently placed thereon. As is apparent from FIG. 5 the spring can expand to no greater extent than the length of the slot, since its expandability is limited by the movement of pin 64 within the slot. This spring and slot linkage also insures against the collapse of the device if the spring should break. This is a very important safety feature, since the device is always used by young children.

The device is simply closed by pivoting spring linkage upwardly around pin 64. Thus, as seen in FIG. 3, the device can be collapsed to a very compact condition. When it is desired to open the device into its operative condition, frame members 12 and 14 are merely pivoted in opposite directions around pin 16. As seen in FIG. 6, spring linkage 52 is maintained in its freely pivotable condition around each of the frame members by means of bearing washers 74. The legs of each of the frame members are relatively collapsed at this point to form an oval shape having a flattened surface against which the bearing washers rest. Similar bearing washers 76 are provided for pin 64.

Obviously many modifications and variations of the present invention are possible in the light of the above teachings. It is, therefore, to be understood that within the scope of the appended claims, the invention may be practiced otherwise than as specifically described.

What is claimed as the invention is:

1. A combination baby walker and jumper comprising a pair of frame members pivotally secured together, a sling seat supported by said frame members, said sling seat including a pair of leg openings, a plurality of ground engaging wheels supported by the bottoms of said frame members and a spring linkage joining one of said frame members to the other, said spring linkage comprising a first arm pivotally secured to one of said frame members, a second arm pivotally secured to the other of said frame members, and means slidably connecting said arms, said connecting means including a spring, whereby the separation of one frame member relative to the other and the expendability of the spring within said linkage are limited by said connected arms.

2. The invention of claim 1 wherein each of said frame members is generally U-shaped, having a bridging section uppermost and the legs downwardly extending, with each of the legs having an outwardly extending portion therein, whereby tipping of the jumper is prevented.

3. The invention of claim 1 wherein said connecting means comprise a pin secured to one of said arms, said pin passing through an elongated slot in the other of said arms and said spring is pivotally secured to said pin and one of said frame members.

References Cited by the Examiner

UNITED STATES PATENTS

| | | | |
|---|---|---|---|
| 2,787,310 | 4/57 | Zerbe | 280—41 X |
| 3,059,963 | 10/62 | Hamilton et al. | 297—5 |
| 3,083,050 | 3/63 | Gil | 297—5 X |

FOREIGN PATENTS 803,342  10/58  Great Britain.

A. HARRY LEVY, *Primary Examiner.*

PHILIP ARNOLD, *Examiner.*